July 31, 1956  J. H. BOOTH  2,756,484
METHOD OF MAKING LOCKED-IN BEARING ASSEMBLY
Filed Sept. 30, 1950
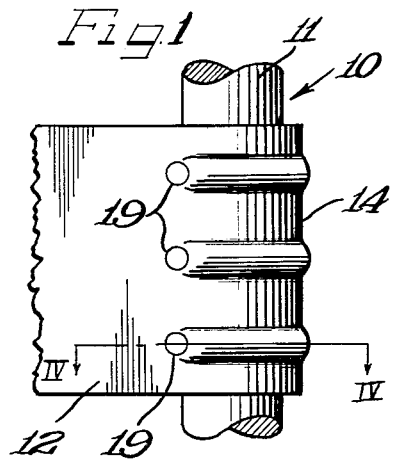
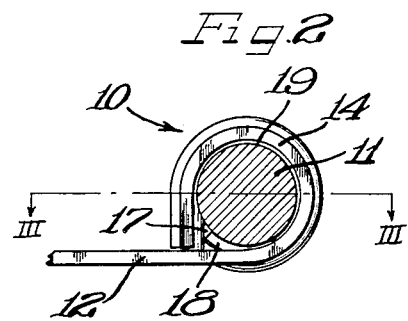
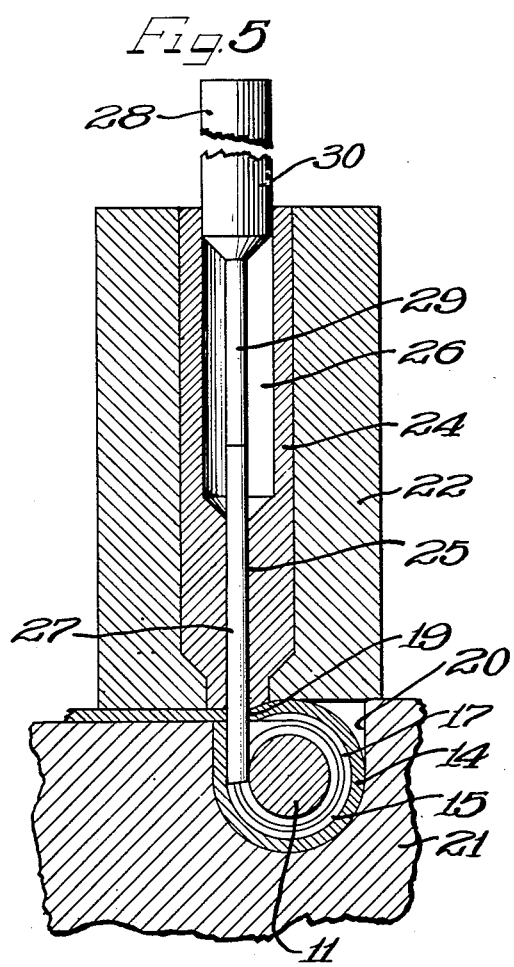
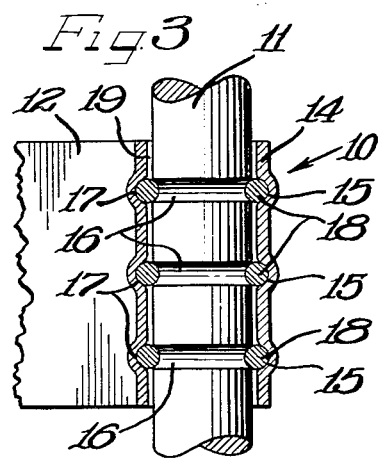
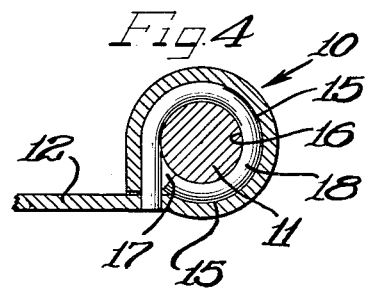
Inventor
James H. Booth United States Patent Office 2,756,484
Patented July 31, 1956

2,756,484

METHOD OF MAKING LOCKED-IN BEARING ASSEMBLY

James H. Booth, Corunna, Venice Township, Shiawasse County, Mich., assignor to Thompson Products, Inc., Cleveland, Ohio, a corporation of Ohio Application September 30, 1950, Serial No. 187,798

2 Claims. (Cl. 29—149.5)

This invention relates to the method of making a bearing assembly for rotatably connecting a pin or shaft within a connecting fitting.

More specifically, the invention relates to the method of making a bearing assembly with a pin or shaft rotatably retained in a fitting by means of ring-like bearings retainingly disposed around the pin or shaft within the fitting.

According to this invention, a fitting which may be formed of sheet metal has a transverse eye formed in one end with spaced internal substantially annular impressions therein and with openings through the fitting connected to and in line with the impressions therein. The impressions are formed by embossing the sheet and also serve to provide beads or ribs which rigidify the eye. A pin or shaft of a diameter slightly smaller than the inside diameter of the eye in the fitting is inserted therethrough and has external annular grooves positioned to be aligned in opposed relationship to each of the impressions in the fitting to form roughly annular channels therebetween. A bearing member which may expeditiously be formed of round wire stock is inserted into each of the holes in the fitting and is driven into the channel formed between each of the impressions and the annular grooves to substantially completely fill the channel. The round wire has a diameter sufficiently small to fit snugly through the holes and sufficiently large to be retained in the channels even when the assembly is subjected to axial thrust loads. The wire bearings may be expeditiously driven into the channel while the fitting and shaft are held in a holding fixture or the like by means of an alignment die and cooperating punch. By this means the uninserted portion of the wire bearing can be held in a slidable rigid position while pressure is exerted on the outward end thereof, thus causing the bearing to curl about the shaft as it follows the channel therearound until the inward end of the bearing wire contacts the portion just being inserted into the hole.

Thus, the invention provides an inexpensively produced, easily assembled locked-in bearing assembly. The mating impressions and grooves need not be held to close manufacturing tolerances since the wire or bearing material will form itself to fit the channel as it is driven in. Since the sheet metal fitting will be slightly sprung open or deformed during the insertion of the bearing wire, a wear takeup means is provided because of the tendency of the fitting to spring back to its original shape. A thin generally annular lubricant reservoir is formed between the fitting and the shaft because of the clearance therebetween.

It is then an object of the present invention to provide a simplified method for rotatably securing a shaft within a fitting.

A further object of this invention is to provide an inexpensive method adapted for mass production for inserting round wire bearing members within substantially annular channels formed by opposed impressions or grooves in a mating shaft and fitting combination.

On the drawings:

Figure 1 is a fragmentary plan view of a bearing assembly according to the present invention;

Figure 2 is a fragmentary end elevational view of the bearing assembly in Figure 1 with the rotatable shaft in section;

Figure 3 is a fragmentary sectional view taken along line III—III of Figure 2 with the shaft shown in elevation;

Figure 4 is a fragmentary sectional view taken along line IV—IV of Figure 1 with the bearing member shown in elevation; and Figure 5 is a fragmentary sectional view showing the method of driving the bearing member into a channel between the fitting and the shaft.

As shown on the drawing:

The bearing assembly 10 of Figure 1 includes a circular pin or shaft 11 rotatably assembled with a fitting 12, preferably of sheet metal.

As shown in Figures 2 and 4, the fitting 12 has an eye or loop 14 formed at one end thereof. The diameter of the eye 14 is slightly greater than the diameter of the rod or shaft 11 which is rotatably retained therein. The eye is embossed to provide a plurality of spaced internal impressions or grooves 15 around the inner periphery thereof, herein shown as three in number. The impressions 15 may be expeditiously embossed in the end portion of the fitting 12 before the looped eye 14 is formed and provide external reinforcing beads.

Annular half-round grooves 16 are formed about the periphery of the shaft 11 in such position as to oppose the impressions 15 in the eye 14 when the shaft is inserted in the eye to provide substantially circular roughly annular passages 17.

In order to retain the shaft 11 in rotatable relationship within the eye 14, bearing members 18, preferably formed of deformable wire material having a diameter equal to or slightly less than the cross-sectional diameter of the passages 17, are inserted into each of the passages to substantially fill the same. Thus, the shaft 11 rotates on the bearing members 18 and at the same time is retained within the eye 14 by the bearing members. Because of the difference in diameter between the shaft and the inside of the eye 14, a generally annular space 19 is formed therebetween in order to provide a lubricant reservoir.

It will be apparent that grooves 15 and 16 and the bearing members 18 are not necessarily of circular cross-section as shown but may be of any suitable cross-section as long as the bearing member conforms to the grooves.

Referring to Figure 5, it will be seen that a very simple method is provided for inserting the bearing wires 18 into the channels 17. Holes or apertures 19 are formed through the fitting 12 adjacent the zone where the curled end of the eye 14 abuts the straight portion of the fitting. These holes provide tangential entrances to the grooves (as best shown in Figure 4) in such positions as to form, substantially, extensions of each of the passages 17 to provide access thereinto. The fittings 12 and the shaft 11 are placed in loosely assembled relationship with the eye 14 disposed in a generally conforming recess 20 in a holding jig or die fixture 21. The holes 19 are disposed outwardly with respect to the recess 20 and the portion of the fitting 12 other than the eye 14 is disposed in parallel relationship on an outer face of the holding jig 21.

A guide or alignment jig 22, having a hardened guide sleeve 24 retainingly disposed therein, is placed over the fitting 12. The sleeve 24 has a circular passage 25 in concentric communicating relationship with one of the holes 19. The passage 25 has substantially the same diameter as the hole 19. A coaxial passage 26 of larger diameter communicates with the upper end of the sleeve 24 (as seen in Figure 5).

A wire blank 27 from which the bearing member 18 is to be formed is inserted through the passage 26 into the passage 25 and through the hole 19 into the passage 17 into the beginning, substantially straight portion thereof. A punch or driving tool 28, having portions 29 and 30 respectively slidable in the passages 25 and 26, is inserted into the sleeve 24 through the passage 26. The downwardly disposed end of the punch portion 29 is abutted against the upward end of the blank 27 and downward force is applied to the punch 28 in order to urge the same downwardly. The punch 28 drives the blank 27 into the passage 17 of the bearing assembly around the shaft 11. The downward force is stopped when the blank is curled substantially completely around the shaft 11, as shown in Figure 4. The length of the wire blank 27 may be such that its outward end will be substantially flush with the surface of the fitting opposite to the eye after insertion thereinto, or the blank may be cut off flush after insertion.

Because of the radially outward force which is exerted on the eye 14 as the blank 27 is driven thereinto, the sheet metal fitting 12 will open up slightly and will exert a spring back pressure about the curled bearing member 18. Thus there is provided a means of automatically taking up wear between the bearing member 18 and the rotatable shaft 11.

It is readily apparent from the above description that the mating grooves 15 and 16 need not be formed with close tolerances since the wire blank 27 will form itself to fit the grooves as it is driven into the passage 17.

It should be noted that the guide jig 22 may have one or more inserts 24 so that the bearing blanks 27 may be inserted one at a time or simultaneously.

From the above description it will be understood that this invention provides an extremely simple and inexpensively manufactured locked-in bearing assembly in which a shaft having spaced annular grooves thereabout is rotatably retained in an eye of a sheet metal fitting by means of wire bearing members disposed in passages formed between the grooves on the shaft and mating impressions or grooves on the inner surface of the eye. A slight clearance is provided between the shaft and the inner surface of the eye to allow for the introduction of lubricant. The mating grooves and the eye need not be formed with close tolerances since the bearing wires conform themselves to the grooves as they are driven into place. A wear takeup means is provided by the spring back pressure against the bearing wire which is caused by the slight deformation of the eye as the bearing wire is driven therein. The bearing assembly may be expeditiously formed by stamping the grooves and punching holes at the inner ends thereof, curling the grooved end of the sheet metal fitting into a substantially circular eye and inserting the grooved shaft into the eye. The bearing wires are driven into the passages between the mating grooves by means of force applied to a punch in a holding jig which is in turn exerted on a bearing wire blank slidably supported in the jig and inserted partially into the passage.

It will be understood that modifications and variations may be effected without departing from the scope of the novel concepts of the present invention.

I claim as my invention:

1. The method of making a locked-in bearing assembly comprising stamping longitudinal impressions at one end portion of a flat sheet metal blank, contemporaneously forming holes adjacent the inner ends of said impressions, rolling said one end of said blank to form a resiliently expansible eye with the impressions inside and with the holes adjacent the outward ends of the impressions, forming spaced annular grooves about a shaft with said grooves arranged to oppose the impressions in the eye when the shaft is inserted therein, assembling said shaft with said eye with said grooves opposing the impressions in the eye, inserting bearing members into the holes in said blank, and driving said bearing members through said holes into the spaces between said opposing impressions and grooves to substantially fill the spaces and to expand said eye to impart inwardly directed spring-bias to said eye for taking up wear between said shaft and said bearing members.

2. The method of making a locked-in bearing assembly comprising forming longitudinal impressions at one end portion of a flat sheet metal blank, contemporaneously forming holes adjacent the inner ends of said impressions, forming spaced annular grooves about a shaft with said grooves arranged to oppose the impressions, forming an eye from the end portion of the flat sheet metal blank with the impressions inside and with the holes providing access to the impressions and with the diameter of the impressions in the eye greater than the diameter of the shaft at the grooves therein by an amount less than a predetermined diameter, assembling said shaft with said eye with said grooves opposing the impressions in the eye, inserting bearing members of said predetermined diameter in the holes in said blank, and expanding the eye by driving said bearing members through said holes into the spaces between said opposing impressions and grooves to substantially fill the spaces and to impart inwardly directed spring bias to the eye.

References Cited in the file of this patent

UNITED STATES PATENTS

| | | |
|---|---|---|
| 23,599 | Montgomery | Apr. 12, 1859 |
| 137,827 | Clark | Apr. 15, 1873 |
| 1,084,582 | Lawson | Jan. 13, 1914 |
| 1,464,386 | Ingram | Aug. 7, 1923 |
| 1,873,245 | Abegg | Aug. 23, 1932 |
| 1,899,343 | Mackey | Feb. 28, 1933 |
| 1,959,027 | Hemstreet | May 15, 1934 |
| 2,047,706 | Reed | July 14, 1936 |
| 2,112,325 | Bentzinger | Mar. 29, 1938 |
| 2,153,388 | Newman | Apr. 4, 1939 |
| 2,164,902 | Coleman | July 4, 1939 |
| 2,172,811 | Snell | Sept. 12, 1939 |
| 2,536,821 | Rappl | Jan. 2, 1951 |